(12) United States Patent
Halberstadt (10) Patent No.: US 9,621,059 B2
(45) Date of Patent: Apr. 11, 2017

(54) METHOD FOR CONTROLLING A SMPC HAVING A SYNCHRONOUS RECTIFICATION SWITCH, A SMPC AND A CONTROLLER THEREFOR

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 244 days.

(21) Appl. No.: 14/629,926

(22) Filed: Feb. 24, 2015

(65) Prior Publication Data

US 2015/0249398 A1     Sep. 3, 2015

(30) Foreign Application Priority Data

Mar. 3, 2014  (EP) .................................... 14157482

(51) Int. Cl.
*H02M 3/335* (2006.01)

(52) U.S. Cl.
CPC ..... *H02M 3/33592* (2013.01); *Y02B 70/1475* (2013.01)

(58) Field of Classification Search
CPC ...... H02M 3/33592; H02M 2001/0051; Y02B 70/1475
See application file for complete search history.

(56) References Cited

U.S. PATENT DOCUMENTS

| | | |
|---|---|---|
| 6,055,170 A | 4/2000 | Yee |
| 6,396,250 B1 | 5/2002 | Bridge |
| 6,594,161 B2 | 7/2003 | Jansen et al. |
| 7,446,513 B2 | 11/2008 | Dikken et al. |
| 9,054,592 B2 | 6/2015 | Yao et al. |
| 9,246,394 B2 | 1/2016 | Deng |

(Continued)

FOREIGN PATENT DOCUMENTS

| | | |
|---|---|---|
| CN | 101471609 A | 7/2009 |
| CN | 102723856 A | 10/2012 |

(Continued)

OTHER PUBLICATIONS

Extended European Search Report for EP Patent Appln. No. 14157482.2 (Oct. 7, 2014), 7 pages.

*Primary Examiner* — Harry Behm (57) ABSTRACT

A controller for a switched mode power converter is disclosed, the switched mode power converter comprising a transformer defining a primary side circuit and a secondary side circuit, the primary side circuit comprising a primary switch, the secondary side circuit comprising a synchronous rectification switch, the controller comprising: a baseline off-set circuit configured to provide a baseline timing off-set between opening the synchronous rectification switch and closing the primary switch; a peak current detector configured to detect a peak negative current in the secondary side circuit; and a feedback circuit configured to add an off-set adaptation to the baseline timing off-set to provide an adapted timing off-set, wherein the feedback circuit is configured to adjust the off-set adaptation to minimize the negative peak current.

A switched mode power converter and electronic equipment using such a controller is also disclose, as is a method for controlling a switch mode power converter.

15 Claims, 8 Drawing Sheets

(56) References Cited

U.S. PATENT DOCUMENTS

| | | | |
|---|---|---|---|
| 2002/0085402 A1* | 7/2002 | Zhang | H02M 3/33592 |
| | | | 363/127 |
| 2004/0062061 A1* | 4/2004 | Bourdillon | H02M 3/33584 |
| | | | 363/21.12 |
| 2010/0110732 A1* | 5/2010 | Moyer | H02M 3/33592 |
| | | | 363/19 |
| 2013/0148385 A1 | 6/2013 | Zhang | |
| 2014/0043865 A1 | 2/2014 | Choi | |

FOREIGN PATENT DOCUMENTS

| | | |
|---|---|---|
| CN | 102882377 A | 1/2013 |
| CN | 103236795 A | 8/2013 |
| CN | 1478318 A | 2/2014 |
| DE | 198 82 461 B3 | 5/2012 |
| EP | 2 568 588 A1 | 3/2013 |

* cited by examiner

METHOD FOR CONTROLLING A SMPC HAVING A SYNCHRONOUS RECTIFICATION SWITCH, A SMPC AND A CONTROLLER THEREFOR

CROSS-REFERENCE TO RELATED APPLICATIONS

This application claims the priority under 35 U.S.C. §119 of European patent application no. 14157482.2, filed on Mar. 3, 2014, the contents of which are incorporated by reference herein.

FIELD

This invention relates to switched mode power converters having a synchronous rectification switch in a secondary side circuit, controllers therefor, and to methods of controlling such switched mode power converters.

BACKGROUND

A flyback converter is a typical example of a switch mode converter having a transformer or other inductive element. In the case of a flyback converter, a primary side circuit includes a switch which typically may be a power MOSFET, which switchedly connects input power to a primary winding of the transformer. While the switch is closed, that is to say, during a primary stroke, current flows through the primary winding; conversely, while the switch is open, that is to say during a secondary stroke, the current is commuted to a secondary side winding of the transformer and flows in a secondary side circuit, typically in order to charge a capacitor and supply power to the load. A capacitor is typically included in circuit in order that, during the primary stroke, the converter may continue to supply power to the load, by partially discharging the capacitor. In order to operate correctly, and in particular to prevent the capacitor being discharged by a current flowing back through the secondary winding during the secondary stroke, the secondary side circuit typically requires a diode or other rectifying component placed in series with the capacitor.

Figure 1:
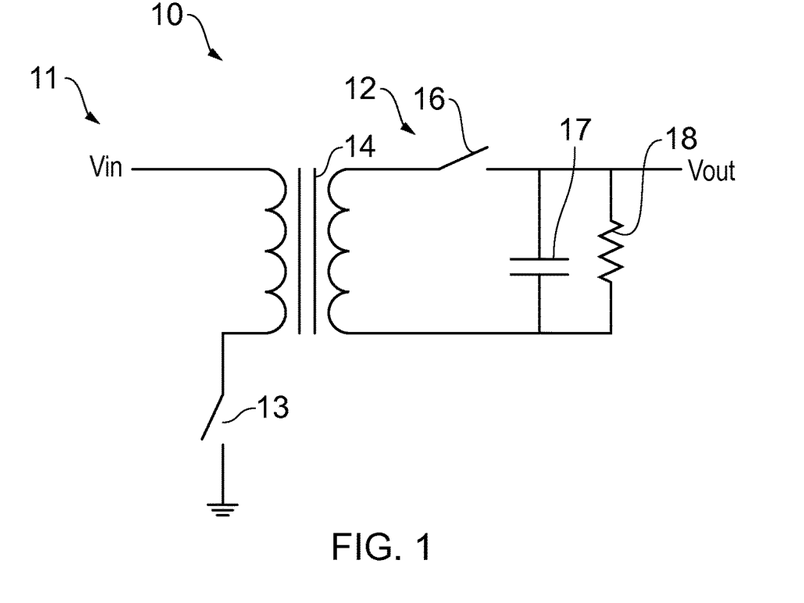
FIG. 1 shows, schematically, a switched mode power converter (SMPC)

A switched mode power converter (SMPC) is shown schematically in FIG. 1, having a primary side 11 and a secondary side 12. In this example the SMPC is a flyback converter 10. A primary side 11 is supplied by input voltage Vin, and comprises a switch 13 connected in series with an inductor which forms a primary side winding of a transformer 14. Transformer 14 has a secondary side winding, across which is connected a output capacitor 17. An output voltage Vout is supplied by the switched mode power converter, and may drive a load 18. A rectifier 16, which typically is a diode (although, as will be described herein below, it may be a switch as shown), is connected in series with the capacitor 17.

Although diodes are generally convenient and inexpensive, and thus suitable for use as the rectifying component 16 in many converters, whilst in the forward conducting state there is a voltage drop across the diode. The power dissipated by this forward voltage drop is lost as heat, and this reduces the efficiency of the converter. Recently it has become increasingly common to replace the diode with an active component, in particular a switch, to provide synchronous rectification. By replacing a diode with an actively controlled switch, typically implemented as a MOSFET, the loss associated with the forward voltage Vf drop in the diode may be replaced by the significantly lower loss due to the on-resistance, Rdson, of the transistor, offering a significant improvement in efficiency.

It will be appreciated, that the timing of the turnoff moment of the synchronous rectifier is important: if it is not switched off in time, the output capacitor will start to discharge; conversely if it is switched off too early, part of the energy delivered to the transformer cannot be properly harvested by the secondary side circuit. Flyback, and other, converters can operate in different modes of operation, including discontinuous mode (DCM), boundary conduction mode (BCM) and continuous conduction mode (CCM). In DCM, the secondary current resulting from the primary or magnetizing current, falls to zero, and there is a gap before the next primary stroke starts. Once the secondary current falls to zero the synchronous rectifier should be switched off. After the synchronous rectifier has been turned off (or the secondary side diode stopped conducting, in the case of passive rectification), the voltage across the transformer winding starts to ring at a frequency determined by sum of the parasitic capacitances at the windings in combination with the magnetizing inductance of the transformer.

For reasons relating to the relative significance of the losses associated with each operation of a power MOSFET switch compared with the continuous ohmic losses in the system associated with RMS currents, higher power converters tend to be relatively more efficient when operated in a continuous conduction mode (CCM).

Designing to ensure a degree of tolerance to temporary over-power situations also favours CCM operation: it may be required that a system can accommodate for instance an overpower of 130% of its design power rating for several minutes. During such intervals efficiency is not that important, but power density of the converter is another requirement that is important. Using a flyback in BCM may be possible in over-power situations, but due to the larger peak currents, the transformer is not allowed to go into saturation, even for short periods. Since the magnetic field is proportional to the current, larger peak currents will cause larger magnetic fields and this in turn requires a transformer have a larger physical size, which is not in line with the requirement for high power density. CCM allows for a lower peak current at the same average current, while the average current determines the power converted. This means that CCM can bring a solution which satisfies not only efficiency requirements, but also power density requirements.

However, in CCM by definition there is still current flowing at the end of the secondary stroke, and as a result a steep slope of the secondary current at the end of the secondary stroke occurs. This occurs because of the rapid change of the voltage across the transformer from the secondary voltage Vout (seen as N×Vout) at the primary side, where N:1 is the primary:secondary turns-ratio of the transformer, to −Vin, where Vin is the supply voltage of the converter. Since the secondary diode or synchronous rectification switch (SR switch) is still conducting at that moment, it cannot be turned off instantly. The result is a steep current change, determined by the leakage inductance of the transformer with a voltage N×Vout+Vin across it. Depending on the reverse recovery time of the diode or SR switch, large negative currents can occur. Such negative currents will cause electromagnetic interference (EMI) and an efficiency reduction, because of (a) energy build up in the leakage inductance that will later dissipate and (b) voltage across the recovering diode in combination with large current during part of the reverse recovery interval. The effect is that the expected efficiency gain is not achieved, because of the additional reverse recovery losses.

Whilst it may not possible to completely eliminate such losses, accurate timing of the switching off moment of a SR switch is important to try to keep the losses to a minimum.

Due to the different slew rates of different transistors, it is not trivial to determine the ideal moment to open the SR switch. A similar problem arises in the control of buck converters, in which it is required to accurately control the timing of switching high side and low side switches. A known solution to that problem is disclosed in U.S. Pat. No. 7,446,513, in which the voltage across the first switch is measured and the timing of the second switch is then adapted in order to get an optimum dead time. In other known solutions, a timing pulse is communicated from the primary side to the secondary side, and this information is used to open the SR switch just before the end of the secondary stroke.

Figure 2:
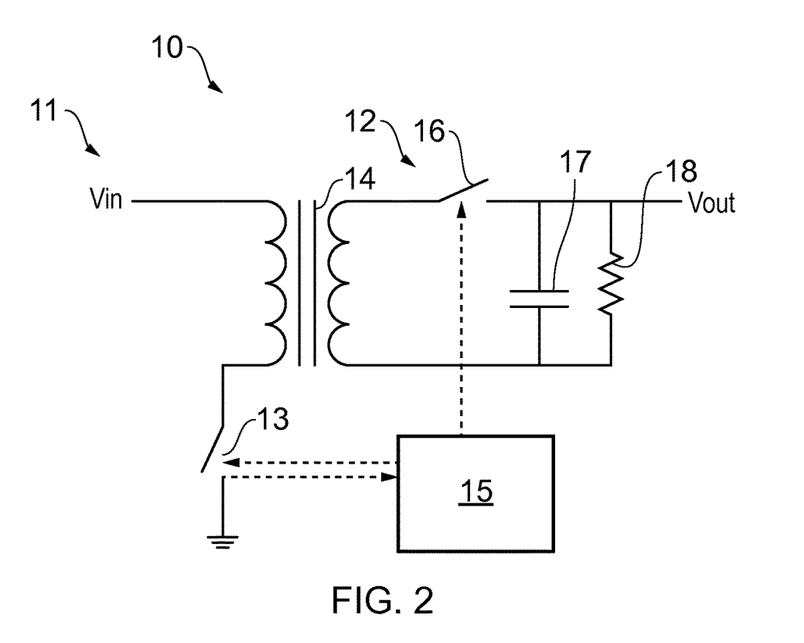
FIG. 2 shows the switch mode power converter of FIG. 1 and including a control circuit.

FIG. 2 shows a schematic of the SMPC 10 shown in FIG. 1, but including a control circuit 15 which both controls the primary side switch 13, and uses the timing information from the primary side switch to control the SR switch 16. However, it may be shown that for a typical switch mode power converter, timing accuracies of ±25 ns are required in order to put this solution into effect. Such accuracy may not be available, or may be only available by use of complex and therefore expensive circuitry, and there thus may be a need for an alternative solution.

SUMMARY

According to a first aspect there is provided a controller for a switched mode power converter which may, without limitation, be a flyback converter, the switched mode power converter comprising a transformer defining a primary side circuit and a secondary side circuit, the primary side circuit comprising a primary switch, the secondary side circuit comprising a synchronous rectification switch, the controller comprising: a baseline off-set circuit configured to provide a baseline timing off-set between opening the synchronous rectification switch and closing the primary switch; a peak current detector configured to detect a peak negative current in the secondary side circuit; and a feedback circuit configured to add an off-set adaptation to the baseline timing off-set to provide an adapted timing off-set. The feedback circuit is configured to adjust the off-set adaptation to tend to minimise the peak negative current. In other words, the feedback circuit is configured to adjust the off-set adaption in response to the detected peak negative current.

Thus according to this aspect, the timing of opening the synchronous rectification switch may not solely be dependent on the accuracy of timing information transferred from the primary to secondary side of circuit. In contrast, a feedback circuit is configured to adjust the offset adaptation to tend to minimise the negative peak current, and thereby provide control of the timing of closing the synchronous rectification switch. The skilled person will appreciate that changes in, for instance, operating conditions may result in perturbations from a minimum in the negative peak current, as a result of which the control circuit operates to bring the negative current back towards a minimum. That is to say, the adjustment tends to minimise the negative peak current.

In embodiments the controller further comprises a communication circuit for communicating the baseline timing off-set from the primary side to the secondary side. Such communication may be by means of an optocoupler, as is conventionally known, or may be by means of communication through the transformer, in which case, in particular, the signal may be either in the current or voltage domain, and may comprise one or may respective either current or voltage spikes.

In embodiments, the communication circuit comprises a transmitter configured to provide a current pulse onto a primary side winding of the transformer, and a receiver configured to detect a resultant current pulse on a secondary side winding of the transformer.

In embodiments, the controller is configured to operate the switched mode power converter in a continuous conduction mode.

In embodiments, the peak current detector comprises an integrator configured to integrate negative current in the secondary side circuit over a predetermined interval and a sample-and-hold circuit configured to store the integrated negative current. By integrating the negative current and using a sample and hold circuit, it may not be necessary to accurately define the moment at which the peak negative current occurs, thereby relaxing the design criteria for the controller.

In embodiments, the peak current detector comprises a sensor adapted to sense a voltage across a parasitic inductance in a grounding contact to the secondary side circuit. The sensor may be adapted to sense the voltage across the parasitic inductance directly, or indirectly, for instance by measuring a voltage across the inductance in a circuit in proximity to the grounding contact and having a mutual inductance with the grounding contact.

In embodiments the feedback circuit comprises a regulation unit. This regulation unit may be configured to adjust the off-set adaptation to minimise the negative peak current by minimising a positive slope of a response curve of the negative peak current with respect to the off-set adaptation. In embodiments the regulation unit may comprise a digital signal processor. In other embodiments, the regulation may be carried out entirely in the analog domain.

According to another aspect there is provided a switched mode power converter comprising a controller as just described and operable in a continuous conduction mode. Use of such a controller in a switch mode power converter may result in an increase in efficiency due to a more accurate timing of the opening of the synchronous rectification switch, thereby potentially avoiding losses associated either with reflected current or "ineffective" charge transfer due to non-ideal opening timing of the synchronous rectification switch.

According to a further aspect there is provided a mains-power electronic equipment comprising such a switched mode power converter.

According to yet another aspect there is provided a method of controlling a synchronous rectification switch on the output of a switched mode power converter comprising a transformer defining a primary side circuit and a secondary side circuit, the primary side circuit comprising a primary switch, the secondary side circuit comprising a synchronous rectification switch, the method compromising: providing a baseline timing off-set between opening the synchronous rectification switch and closing the primary switch; detecting a peak negative current in the secondary side circuit; and adding an off-set adaptation to the baseline timing off-set to provide an adapted timing off-set; and adjusting the off-set adaptation to minimise the negative peak current.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which

FIGS. 10a-10e show shows simulation results of operating a detector such as that shown in FIG. 7a.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 3:
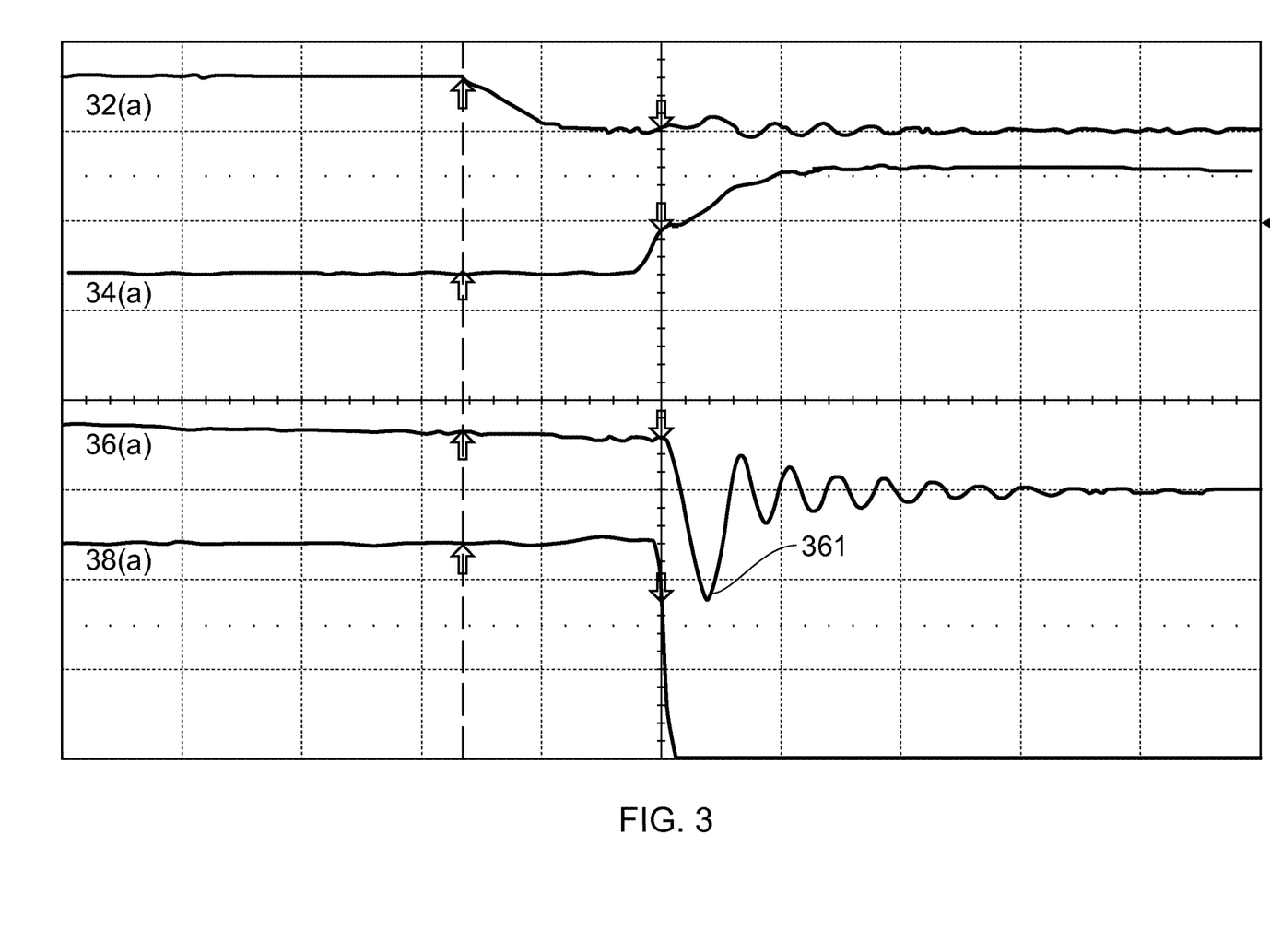
FIG. 3 shows various waveforms of a switched mode power converter, in which a synchronous rectification switch is opened early.
Figure 4:
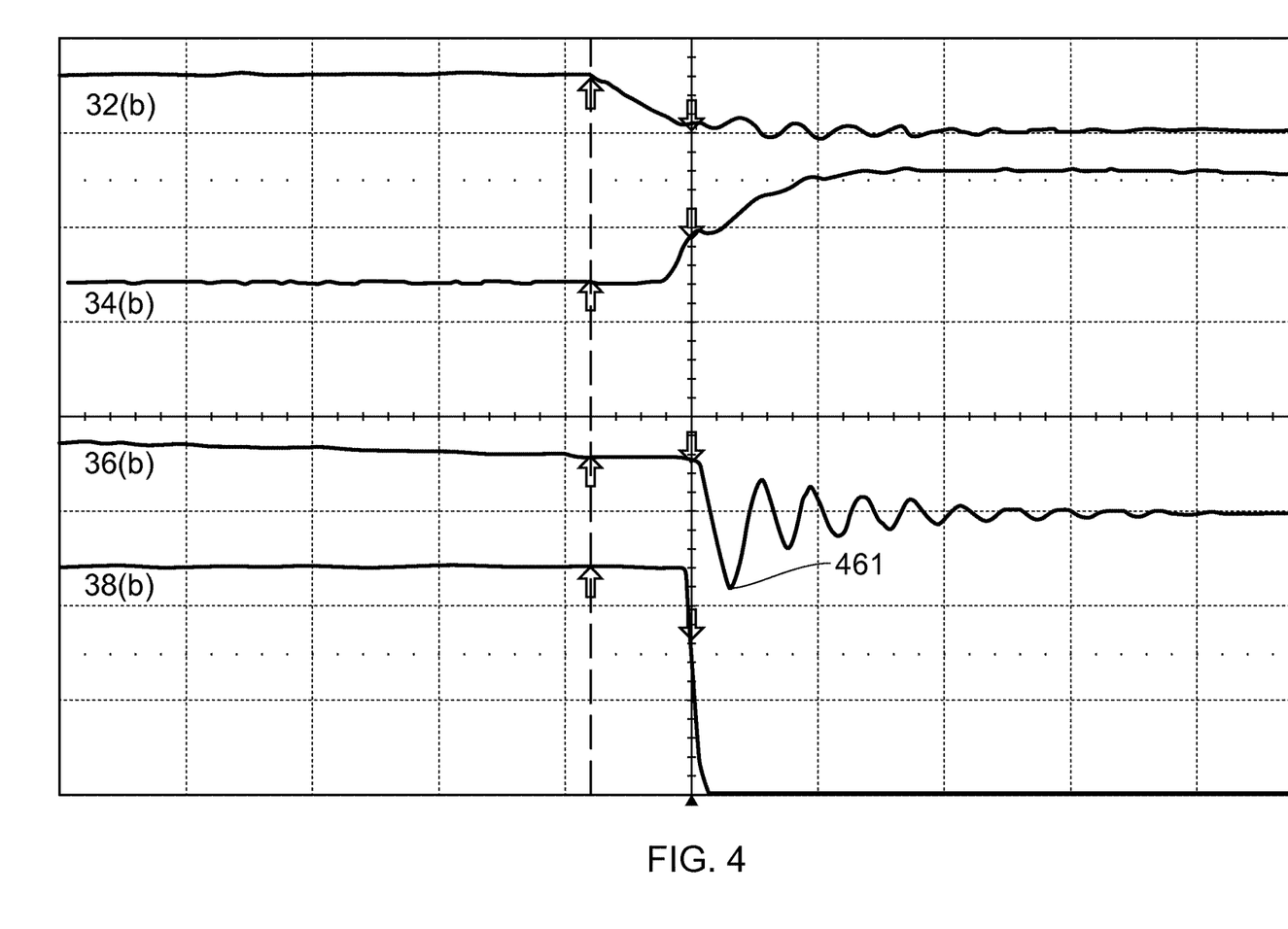
FIG. 4 shows various waveforms of a switched mode power converter, in which a synchronous rectification switch is opened at an ideal moment.
Figure 5:
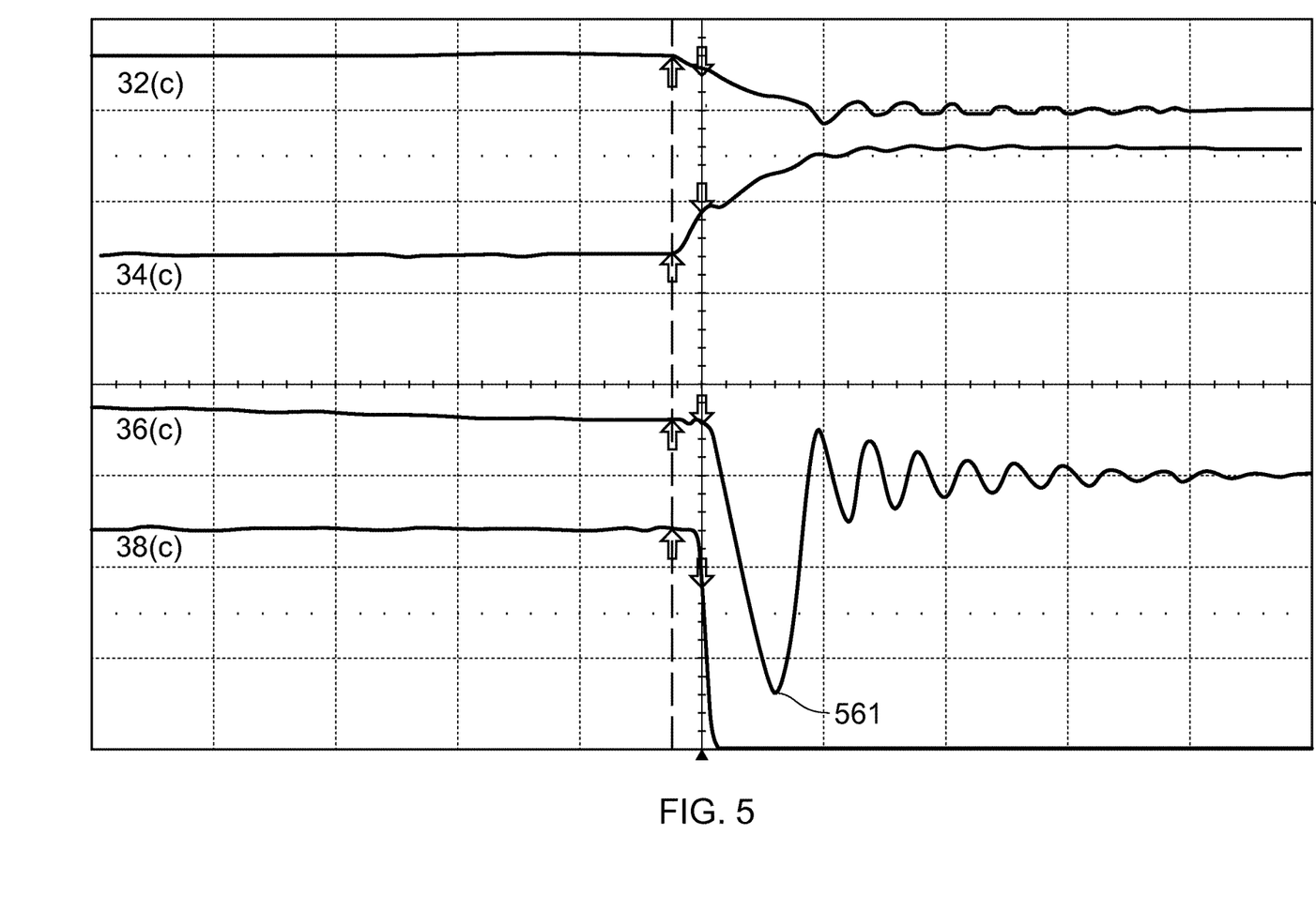
FIG. 5 shows various waveforms of a switched mode power converter, in which a synchronous rectification switch is opened late.

FIGS. 3, 4 and 5 show the effects of the relative timing of the turn-off of the SR switch 16 and the turn-on of the primary side switch 13 in order to start the primary stroke, in the case of continuous conduction mode operation. Plots 32 and 34 show respectively the gate voltage on the SR switch (at 32(a), 32(b), and 32(c) respectively) and primary side switch (at 34(a), 34(b), and 34(c) respectively), for example timings in which the SR switch is turned off too early as shown in FIG. 3, turned off at the ideal moment as shown in FIG. 4, and turned off too late, as shown in FIG. 5. The figures also show at 36 and 38 the secondary side current and the primary side switch drain voltage, again for the respective scenarios wherein the SR switch timing is too early, ideal, and too late (FIGS. 3, 4 and 5 respectively).

Considering first the scenario shown in FIG. 3 wherein the SR switch is turned off too early; in a practical example this may be 250 ns before the primary switch is turned on. This causes the SR switch to be open at the moment that the primary switch is turned on. However the secondary current flows in the body diode of the SR switch at that moment. This gives reverse recovery of the body diode; being a body diode this reverse current recovery is slow (in comparison to a Schottky diode), and this explains the large negative current spike shown at 361.

A more ideal solution is to delay the opening of the SR switch relative to that shown in FIG. 3. Such a timing is shown in FIG. 4; in this figure the SR switch is turned off exactly at the moment that the secondary current reaches zero. As a result there will be no reverse recovery in the body diode, since it will not be forward biased. However, even in this ideal situation, it is noted that the negative current spike, shown at 461, is not completely eliminated, but is only minimised: this is due to the fact that even in the absence of reverse recovery, a voltage and current ringing exists due to the parasitic capacitance across the SR switch on the leakage inductance of the transformer.

If, however, opening of the SR switch is left too late, that is to say the delay between the opening of the SR switch and the closing of the primary switch is too short, the situation shown in FIG. 5 occurs. Here, negative current buildup (due to di/dt) occurs over an even longer period, resulting in an even larger negative current spike, shown at 561. Such a large current spike may be entirely unacceptable.

Embodiments are directed towards making one or more measurements, on the secondary side, which enable the current spike 361, 461 and 561 to be reduced or even minimised.

Figure 6:
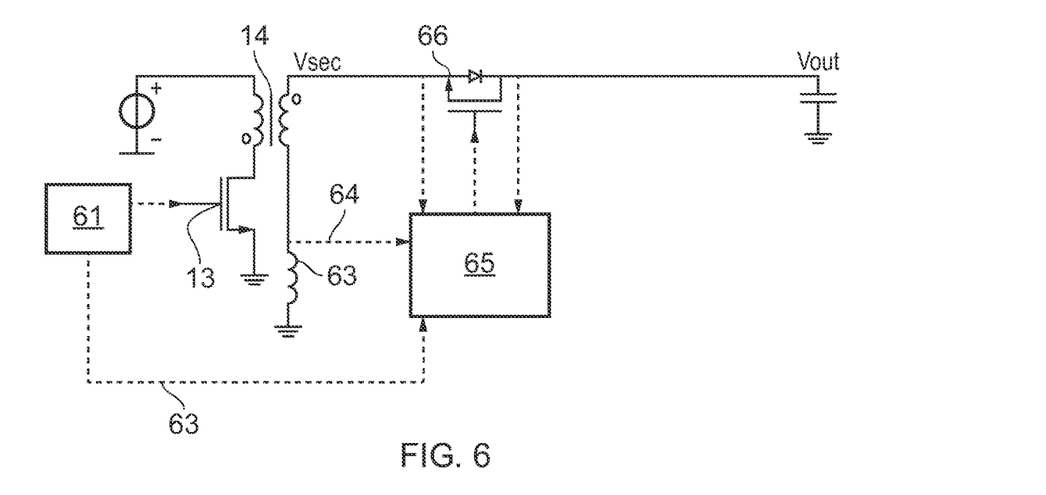
FIG. 6 shows, schematically, a switch mode power converter comprising a controller according to embodiments.

The current in the secondary circuit may be sensed by means of, for example, the parasitic inductance which will occur in a grounding contact to the secondary side circuit. An example of the control are utilising such parasitic inductance is shown in FIG. 6. FIG. 6 shows, schematically, a switch mode power converter, with a primary side switch 13, and a synchronous rectification switch 66 on the secondary side. The primary switch 13 is controlled by means of primary controller 61, on the primary side circuit. The synchronous rectification switch 66 is controlled by means of secondary controller 65, on the secondary side circuit. Information from the primary controller 61, in particular regarding timing of the primary switch 13, is communicated to the secondary controller 65 by means of communication path 62. Secondary controller 65 also senses the current in the secondary circuit by sensing, at 64, the voltage across a parasitic inductance 63, between the secondary winding of transformer 14 and ground. Secondary controller 65 also senses the voltage across the synchronous rectification switch 66, being the difference between the output voltage of Vout and the secondary winding voltage Vsec. Finally, the secondary controller 65 controls the synchronous rectification switch.

By measuring the current in the secondary side circuit, the secondary controller 65 is able to adjust the timing of the switch-off moment of the secondary synchronous rectification switch 66, in order to reduce the negative current spike, as will be described in more detail hereinbelow.

Figure 7A:
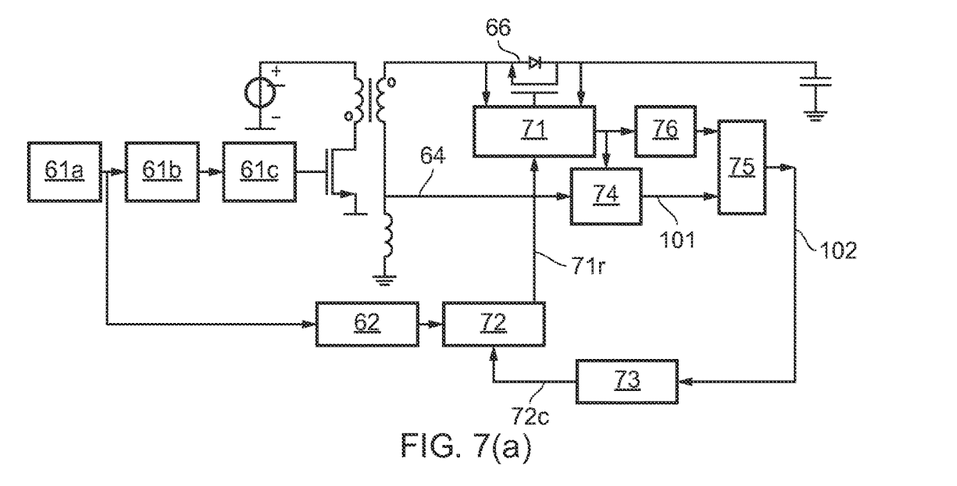
FIG. 7a shows schematically, a switch mode power converter comprising a controller according to embodiments in more detail.

FIG. 7a shows, schematically, the switch mode power converter of FIG. 6, comprising a controller, in more detail. This figure shows a flyback converter, which comprises a primary side control block 61a which sets the timing for the switching—both on and off—of the primary switch 13. An output from the control block 61a is sent via a communication channel 62 to the secondary side circuit. This output, in particular the rising slope command to close the switch, is delayed by a delay block 61 and then supplied to switch driver 61c. Delay block 61b therefore operates as a baseline off-set circuit, and provides a baseline timing offset between opening the synchronous rectification switch and closing the primary switch.

On the secondary side, the synchronous rectification switch 66 is driven by a driver 71. The driver 71 closes the synchronous rectification switch 66 in order to start its conduction interval, at the moment when the voltage across the synchronous rectification switch becomes positive, corresponding to the start of the secondary stroke. The driver 71 opens the synchronous rectification switch 66, at a reset moment defined by an output 71*r* of an adaptive delay block 72. The adaptive delay block 72 uses the timing information provided by the communication channel 62, and adds an additional delay which is determined by a control input vcontrol at 72*c*. The control input vcontrol at 72*c* is provided by regulation block 73. The regulation block 73 allows for determining an ideal moment for the end of the conduction interval of the synchronous rectification switch 66, in relation to the start of the next following primary stroke.

In the embodiment shown in FIG. 7*a*, this is achieved by measuring the voltage 64 across the parasitic inductance 63 between the secondary side winding of the transformer and ground. This voltage is detected by a detector 74, and in particular the detector detects the negative peak value of the sensed current after the reset input of the sector becomes inactive. The output of the detector 74 is sampled by means of a sample and hold unit 75, shortly after the end of the synchronous rectification switch conduction interval. In the embodiment shown in FIG. 7*a*, this is 500 ns after the end of the synchronous rectification switch conduction interval, this timing being set by a delay block 76. As a result, the output of the sample and hold block 75 represents the peak value of the negative current spike this information may be processed by the regulation block 73, in order to determine an optimum, and the control input 72*c* may be set according to this optimum.

Figure 7B:
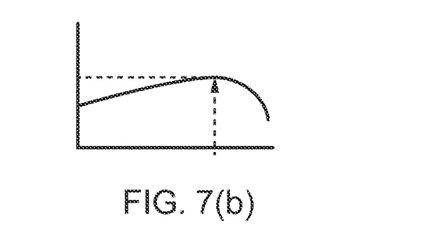
FIG. 7b shows the relationship of a detected voltage and a control input according to embodiments.

The relationship being the detected voltage (Vdetected), and the control input—that is to say, an offset adaptation—is shown in FIG. 7*b*, in which the detected voltage is plotted on the y-axis against the additional delay with respect to the predetermined offset, on the x-axis. Too short an additional delay results in the body-diode of the switch conducting, the slope to this side of the maximum point is not large, since the additional delay does not change the reverse recovery very much. However, if the delay is too large, the detected voltage falls steeply relative to the maximum point.

Determining the optimum may be effected in a variety of ways, as will be familiar to the skilled person; in particular, a goal-seeking algorithm may be used.

Figure 8:
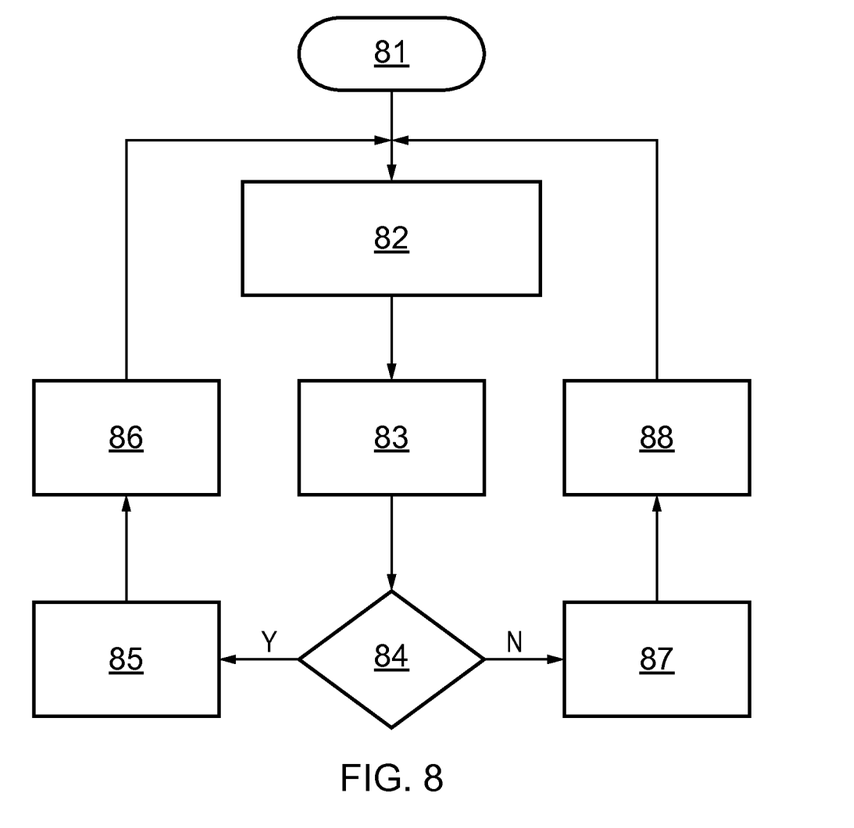
FIG. 8 shows a flowchart of a method of detecting a peak negative current, according to embodiments.

An example of such a goal seeking algorithm, or maximum tracking algorithm, is shown in FIG. 8: at the first switch cycle, shown at 81, an initial value for the control input is set. This may ensure a sufficient negative delay to provide for primary switch turn-on with SR switch body diode conduction according to FIG. 3. This corresponds to a safe situation, but not the optimum efficiency. In order to detect the derivative of Vdetected—which is a function of the control input—the regulation block slightly increases the control input and calculates the derivative from previous samples from cycle n down to n−m, shown at block 83. Based on the calculated derivative the next value for the control input is set: that is to say, depending on whether the decision box 84 "is there sufficient positive slope" is answered "yes" or "no", vcontrol is increased (by "increasing vcontrol" at 85 and then "going to next cycle" at 86) or reduced (by "decreasing vcontrol" at 87 and then "going to next cycle" at 88). Vcontrol is the voltage at control input 72*c* in FIG. 7*a*. This algorithm therefore converges towards, or tends towards, the optimum point, giving the situation of FIG. 4.

There may be a slight deviation from this optimum since an algorithm such as that shown in FIG. 8 may need to apply some deviation in order to keep tracked to the optimum; however, this deviation may generally be small and acceptable.

Figure 9:
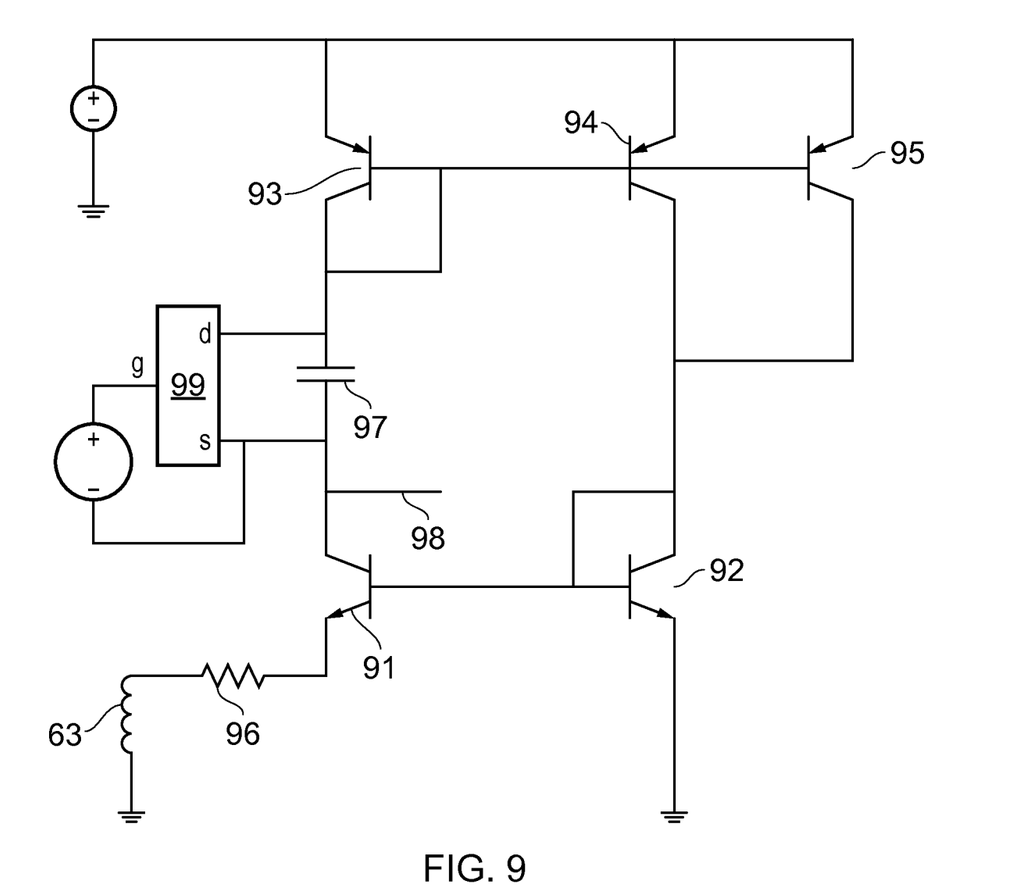
FIG. 9 shows a detector circuit for use in a method such as that shown in FIG. 8.
Figure 10A:
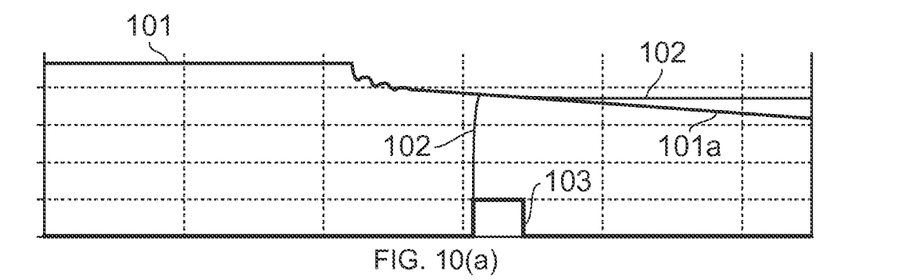
Figure 10B:
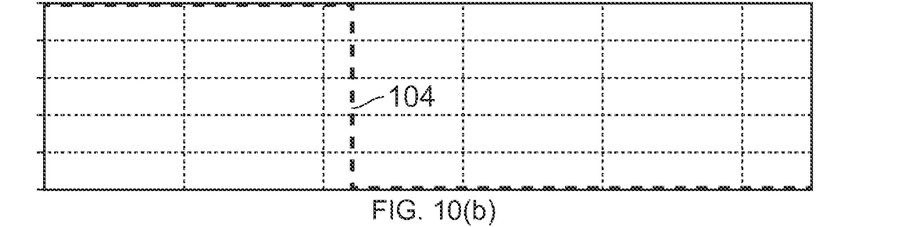
Figure 10C:
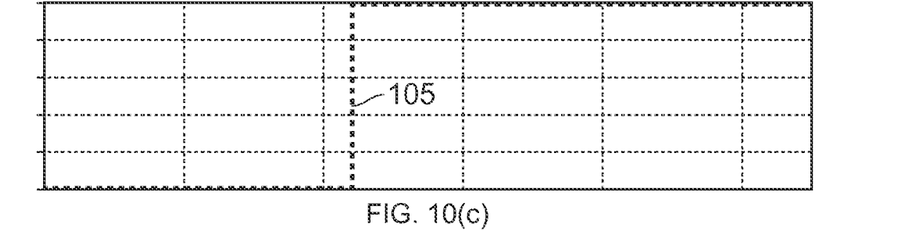
Figure 10D:
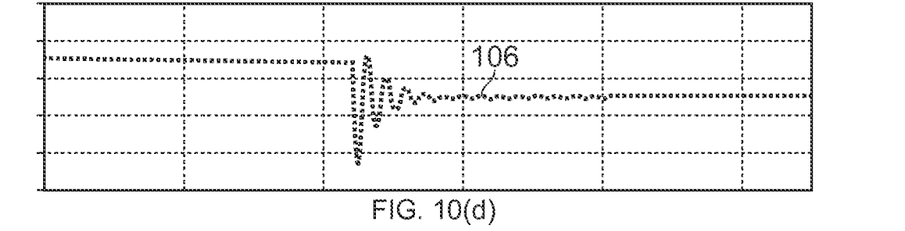
Figure 10E:
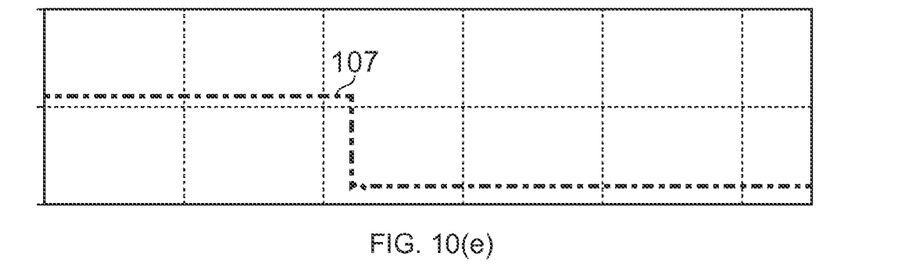

A circuit which implements a detector 74 is shown in FIG. 9. The circuit comprises a current mirror arrangement, providing a zero output impedance, linked to an integrator 97 with reset switch 99. The parasitic inductance, acting as the sensor is shown 63. In this embodiment, thus, a physical part of the track where the current flows is sensed. In other embodiments, a short wire close to the path may be provided, effectively working as transformer; the current in that secondary wire may then be sensed. Transistors 91, 92, 93, 94 and 95 form a fast voltage controlled current source such that the voltage across inductor 63 is converted into a current through resistor 96: the current source may react quickly, or be extremely fast, since the voltage at the emitter of transistor 91 is fixed relative to its threshold voltage Vt and the threshold voltage for a typical transistor in such a circuit is well defined, 26 mV at 25° C. The voltage may be calculated to be Vt× ln(2)—that is, 36 mV at 25° C. Thus, for practical purposes the voltage at this point may be considered to be held at zero. The current in resistor 96 is forced to flow through capacitor 97, and as a result, the voltage across capacitor 97 is the integral of the voltage across the sensor. Since the capacitor 97 is tied to the emitter of transistor 91, in which only positive current can flow, the voltage Vdetect 98 across capacitor 97 represents the sum of the negative peak currents for subsequent ringings of the current spike in the synchronous rectification switch.

In this figure, shown at 99 is a reset switch, for resetting the integrator 97, to define the zero level for vdetect. The switch 99 is close, by a control signal "reset" to discharge the capacitor at the start of each cycle.

The skilled person will appreciate that transistors 91, 92, 93, 94 and 95 are arranged in a current mirror arrangement, so the circuit may also be viewed as a current mirror (91, 92, 93, 94 and 95), linked to an integrator (97) which can be reset by a switch (99); viewed from this perspective, the arrangement of the current mirror is such that the current supplied to the integrater 97 is a copy of the current through resistor 96, which itself is determined by the inductance 63. Although transistors 91, 92, 93, 94 and 95 are depicted as bipolar transistors, the skilled person will appreciate that other transistors, such as without limitation MOSFET, may be used in the alternative.

FIGS. 10*a*-10*e* show simulation results of operating a detector such as that shown in FIG. 7*a* in a flyback convertor operating in CCM. Various signals are shown: in particular vdetect, being the voltage across capacitor 97, at 101; vdetected, which is the output from the sample and hold module unit 75, is shown at 102; and the sampling signal (according to block 76), is shown at 103. This signal for driving the synchronous rectification switch is shown at 104, and that for driving the gate of the primary switch is shown at 105. The current in the sensor in series with the synchronous rectification switch is shown at 106, and the voltage at the drain of the primary switch is shown at 107. As can be seen from the figure, the detector integrates during the negative parts, of the current ringing. The sample is chosen at a moment when most of the ringing has damped. The skilled person will appreciate that, since a bias current is added to the integrated current, the detector output continues to fall with a fixed slope (as shown at 101*a*), when nothing is detected. Thus sampling is done at a moment soon after most of the ringing has damped, which also provides sufficient time to process the sampled output.

The skilled person will appreciate that, although embodiments have been described above with reference to flyback converters, the invention is not limited to, and may extend for example and without limitation to other converters such as half-bridge converters, boost and resonant converters.

From reading the present disclosure, other variations and modifications will be apparent to the skilled person. Such variations and modifications may involve equivalent and other features which are already known in the art of controllers for switched mode power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A controller for a switched mode power converter,
the switched mode power converter comprising a transformer defining a primary side circuit and a secondary side circuit, the primary side circuit comprising a primary switch, the secondary side circuit comprising a synchronous rectification switch,
the controller comprising:
a baseline off-set circuit configured to provide a baseline timing off-set between opening the synchronous rectification switch and closing the primary switch;
a peak current detector configured to detect a peak negative current in the secondary side circuit; and
a feedback circuit configured to add an off-set adaptation to the baseline timing off-set to provide an adapted timing off-set,
wherein the feedback circuit is configured to adjust the off-set adaptation to tend to minimize the peak negative current.

2. A controller according to claim 1, further comprising a communication circuit for communicating the baseline timing off-set from the primary side to the secondary side.

3. A controller according to claim 2, wherein the communication circuit comprises a transmitter configured to provide a current pulse onto a primary side winding of the transformer, and a receiver configured to detect a resultant current pulse on a secondary side winding of the transformer.

4. A controller according to claim 1 configured to operate the switched mode power converter in a continuous conduction mode.

5. A controller according to claim 1, wherein the peak current detector comprises an integrator configured to integrate negative current in the secondary side circuit over a predetermined interval and a sample-and-hold circuit configured to store the integrated negative current.

6. A controller according to claim 1 wherein the peak current detector comprises a sensor adapted to sense a voltage across a parasitic inductance in a grounding contact to the secondary side circuit.

7. A controller according to claim 6, wherein the sensor is adapted to sense the voltage across the parasitic inductance directly.

8. A controller according to claim 6, wherein the sensor is adapted to sense the voltage across the parasitic inductance indirectly, by measuring a voltage across the inductance in a circuit in proximity to the grounding contact and having a mutual inductance with the grounding contact.

9. A controller according to claim 1, wherein the feedback circuit comprises a regulation unit.

10. A controller according to claim 9, wherein the regulation unit is configured to adjust the off-set adaptation to tend to minimise the negative peak current by minimizing a positive slope of a response curve of the negative peak current with respect to the off-set adaptation.

11. A controller as claimed in claim 9, wherein the regulation unit comprises a digital signal processor.

12. A controller according to claim 1, wherein the switch mode power converter comprises a flyback converter.

13. A switched mode power converter comprising a controller as claimed in claim 1 and operable in a continuous conduction mode.

14. A mains-power electronic equipment comprising a switched mode power converter as claimed in claim 13.

15. A method of controlling a synchronous rectification switch on the output of a switched mode power converter comprising a transformer defining a primary side circuit and a secondary side circuit, the primary side circuit comprising a primary switch, the secondary side circuit comprising a synchronous rectification switch,
the method comprising:
providing a baseline timing off-set between opening the synchronous rectification switch and closing the primary switch;
detecting a peak negative current in the secondary side circuit; and
adding an off-set adaptation to the baseline timing off-set to provide an adapted timing off-set; and
adjusting the off-set adaptation to minimize the peak negative current.

* * * * *